United States Patent [19]
Montulli

[11] Patent Number: 5,826,242
[45] Date of Patent: Oct. 20, 1998

[54] METHOD OF ON-LINE SHOPPING UTILIZING PERSISTENT CLIENT STATE IN A HYPERTEXT TRANSFER PROTOCOL BASED CLIENT-SERVER SYSTEM

[75] Inventor: Lou Montulli, Palo Alto, Calif.

[73] Assignee: Netscape Communications Corporation, Mountain View, Calif.

[21] Appl. No.: 919,439

[22] Filed: Aug. 27, 1997

Related U.S. Application Data

[62] Division of Ser. No. 540,342, Oct. 6, 1995, Pat. No. 5,774,670.

[51] Int. Cl.$^6$ .............................. G06F 17/60; G06F 15/16
[52] U.S. Cl. ..................... 705/27; 705/26; 395/200.58; 395/683
[58] Field of Search .................. 705/26, 27; 395/200.31, 395/200.47, 200.48, 200.49, 200.54, 200.58, 683

[56] References Cited

U.S. PATENT DOCUMENTS

| | | | |
|---|---|---|---|
| 5,710,887 | 1/1998 | Chelliah et al. | 705/26 |
| 5,721,832 | 2/1998 | Westrope et al. | 705/27 |
| 5,740,425 | 4/1998 | Povilus | 705/26 |
| 5,745,681 | 4/1998 | Levine et al. | 705/26 |
| 5,754,656 | 5/1998 | Nishioka et al. | 705/26 |
| 5,757,917 | 5/1998 | Rose et al. | 705/26 |
| 5,758,327 | 5/1998 | Gardner et al. | 705/26 |
| 5,760,771 | 6/1998 | Blonder et al. | 705/26 |
| 5,761,649 | 6/1998 | Hill | 705/27 |

OTHER PUBLICATIONS

Netscape, "Persistent Client State HTTP Cookies", 1997, http://home.netscape.com/newsref/std/cookie spec.html.
Montulli et al., "Proposed HTTP State Management Mechanism", Aug. 16, 1996, HTTP Working Group.
"Cookie I–D Drafts", Nov. 21, 1997, http://portal.research-.bell–labs.com/~dmk/cookie–ver.html.
CMP NetGuide Magazine, "The Trouble With Cookies", May 1, 1996, Issue 305.
Van Name et al., "Putting The Lid On Pandora's Cookie Jar", PC Week, vol. 13, No. 33, Aug. 19, 1996, p. N8(1).
Foster, "Can Mixing 'Cookies' With Online Marketing Be A Recipe For Heartburn?", InfoWorld, vol. 18, No. 30, Jul. 22, 1996, p. 54(1).
McCarthy, "The Netscape Biscuit Company", Government Computer News, vol. 15, No. 24, Sep. 23, 1996, p. 55(2).
Raynovich, "Microsoft Readies Browser Update", LAN Times, vol. 13, No. 17, Aug. 5, 1996, p. 7(1).

*Primary Examiner*—Eric W. Stamber
*Attorney, Agent, or Firm*—Michael A. Glenn

[57] ABSTRACT

A method and apparatus for transferring state information between a server computer system and a client computer system. In one embodiment of the method, an http client requests a file, such as an HTML document, on an http server, and the http server transmits the file to the http client. In addition, the http server transmits a state object, which describes certain state information, to the http client. The http client stores the state object, and will typically send the state object back to the http server when making later requests for files on the http server. In a typical embodiment, the state object includes a domain attribute which specifies a domain or network address, and the state object is transmitted from the http client to a server only when the http client makes an http request to the server and the server is within the domain. In one embodiment, the apparatus includes a processor and memory and a computer readable medium which stores program instructions. In the case of the client system, the instructions specify operations such as receiving and storing the state information; in the case of the server system, the instructions specify operations such as sending the state information to a client system.

4 Claims, 8 Drawing Sheets

```
<Title>Distributed Image Loading Example </Title>
<h1>Distibuted Image Loading Example</h1>

One of the major features of the world-wide-web is the ability to
retreive images from sites distributed around the world.  These images
can then be combined with a text document retrieved separately and
presented as a single "virtual" document to an end-user.  This HTML
document demonstrates this capability.<p>

This document was fetched from a server in northern California.
However, this image:
<IMG align=middle src="http://www.nesa.uiue.edu/demoweb/al-small.gif">
was obtained from Illinois.<P>

And this one: <IMG align=middle src="http://www.su.se/SUlogo.gif">came
from the <A href="http://www.su.se/index.html">University of
Stockholm</A>.
```

*FIG. 3A*

Distributed Image Loading Example

One of the major features of the world-wide web is the ability to retrieve images from sites distributed around the world. These images can then be combined with a text document retrieved separately and presented as a single "virtual" document to an end-user. This HTML document demonstrates this capability.

This document was fetched from a server in Northern California. However, this image:

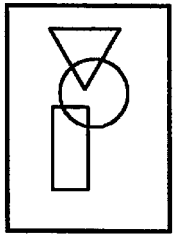

was obtained from Illinois. And this one:

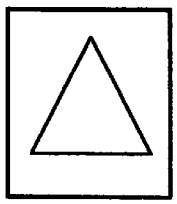

was obtained from the University of Stockholm.

*FIG. 3B*

METHOD OF ON-LINE SHOPPING UTILIZING PERSISTENT CLIENT STATE IN A HYPERTEXT TRANSFER PROTOCOL BASED CLIENT-SERVER SYSTEM

This is a divisional of application Ser. No. 08/540,342 filed on Oct. 6, 1995 now U.S. Pat. No. 5,774,670.

FIELD OF THE INVENTION

This invention relates to communication in a client-server computer systems. Specifically, the invention relates to client-server computer systems in which a server can send state information to a client and the client stores the state information for later retransmissions back to the server.

BACKGROUND OF THE INVENTION

An important use of computers is the transfer of information over a network. Currently, the largest computer network in existence is the InterNet. The InterNet is a worldwide interconnection of computer networks that communicate using a common protocol. Millions of computers, from low end personal computers to high-end super computers are coupled to the InterNet.

The InterNet grew out of work funded in the 1960s by the U.S. Defense Department's Advanced Research Projects Agency. For a long time, InterNet was used by researchers in universities and national laboratories to share information. As the existence of the InterNet became more widely known, many users outside of the academic/research community (e.g., employees of large corporations) started to use InterNet to carry electronic mail.

In 1989, a new type of information system known as the World-Wide-Web ("the Web") was introduced to the InterNet. Early development of the Web took place at CERN, the European Particle Physics Laboratory. The Web is a wide-area hypermedia information retrieval system aimed to give wide access to a large universe of documents. At that time, the Web was known to and used by the academic/research community only. There was no easily available tool which allows a technically untrained person to access the Web.

In 1993, researchers at the National Center for Supercomputing Applications (NCSA) released a Web browser called "Mosiac" that implemented a graphical user interface (GUI). Mosiac's graphical user interface was simple to learn yet powerful. The Mosiac browser allows a user to retrieve documents from the World-Wide-Web using simple point-and-click commands. Because the user does not have to be technically trained and the browser is pleasant to use, it has the potential of opening up the InterNet to the masses.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers communicate using a protocol called "HyperText Transfer Protocol" (HTTP). A browser opens a connection to a server and initiates a request for a document. The server delivers the requested document, typically in the form of a text document coded in a standard Hypertext Markup Language (HTML) format, and when the connection is closed in the above interaction, the server serves a passive role, i.e., it accepts commands from the client and cannot request the client to perform any action.

The communication model under the conventional Web environment provides a very limited level of interaction between clients and servers. In many systems, increasing the level of interaction between components in the systems often makes the systems more robust, but increasing the interaction increases the complexity of the interaction and typically slows the rate of the interaction. Thus, the conventional Web environment provides less complex, faster interactions because of the Web's level of interaction between clients and servers.

In the conventional Web environment, clients do not retain information of a session after the session is closed. In many systems, the ability to retain information after the systems become inactive is crucial to the functioning of the systems. Thus, it is desirable to allow clients to have this ability.

SUMMARY OF THE INVENTION

The present invention involves a client-server system on a network in which a server can send state information to a client and the client stores the state information. The stored state information can later be sent back to the server at appropriate times. In this manner, the state of a client can be maintained in the client-server system where no state inherently exists in such a system.

One embodiment of the present invention is a network system for communicating documents containing information such as text and one or more images. The system comprises a first computer (i.e., a server) capable of sending such documents over a network such as the InterNet. The system also has a second computer (i.e., a client) which can request these documents or files from the server. After the requested documents are received, the client can display the documents. In accordance with the present invention, the server can send state information to the client when a document is sent. The client then stores the state information, which is typically in the form of a state object. In a subsequent request for documents to the server, the client can send the stored state information to the server.

In an embodiment of the invention, the server uses a hypertext transfer protocol ("http") to communicate over the network with clients; such clients also communicate with the server using the hypertext transfer protocol. This server and these clients are referred to as an http server and http clients respectively. The server typically will include a server processor and a memory and a computer readable medium, such as a magnetic ("hard disk") or optical mass storage device, and the computer readable medium of the server contains computer program instructions for transmitting the file from the server system to the client system and for transmitting the state object to the client system. The client typically will include a client processor and a memory and a computer readable medium, such as a magnetic or optical mass storage device, and the computer readable medium of the client contains computer program instructions for receiving the state object, which specifies the state information, from the server and for storing the state object at the client. The state object, in a typical embodiment, will include a name attribute, such as a domain attribute.

One of the applications of the present invention is an on-line shopping system. A customer can browse information delivered by a merchant server using a browser running on a client. The customer can also select products to be placed in a virtual shopping basket. The server then sends state information related to the selected products to the browser on the client for storage. When the customer wants to purchase the products in the virtual shopping basket, the browser sends the corresponding state information to a specified check-out Web page for processing.

Another application of the present invention is an "on-line" information service, such as a newspaper's Web server which includes articles or other information from the newspaper's subscription services. In one example, a newspaper or publishing company may have several different publications, each requiring a separate subscription fee which may differ among the different publications. A user of the information service may browse the different publications by making http requests, from the client's/user's computer system, to the publisher's Web server which responds with the requested publication and state information specifying the user's identification, and other subscription information (e.g., user registration and billing information) which allows the user to view the contents of the publication; this information is typically provided by the user at least once in a conventional log-on process. Thereafter, this information is included in the state information which is exchanged between the client and the server in the process of the invention. Accordingly, when the user, during the browsing process, desires to view another publication (e.g., from the same or different publisher) this state information will be transmitted back to the Web server to provide the necessary subscription information (thereby entitling the user to view the publication) without requiring the user to re-enter the necessary subscription information. In this manner, a user may browse from publication to publication on the Web server or a different Web server in the domain without having to re-enter, when seeking a new publication, the necessary subscription information.

These and other features of the present invention will be disclosed in the following description of the invention together with the accompanying drawings.

BRIEF DESCRIPTION OF THE DRAWINGS

The objects, features, and advantages of the present invention will be apparent from the following detailed description of the preferred embodiment of the invention with references to the following drawings.

FIG. 3A shows an example of an HTML document which can be processed by the browser of the present invention.

FIG.-3B shows the integrated document corresponding to the HTML document of FIG. 3A as it would appear on a display screen of a client computer.

DETAILED DESCRIPTION

Methods and apparatuses for maintaining state information in a client-server based computer network system are disclosed. The following description is presented to enable any person skilled in the art to make and use the invention. For purposes of explanation, specific nomenclature is set forth to provide a thorough understanding of the present invention. However, it will be apparent to one skilled in the art that these specific details are not required to practice the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Prior to describing the present invention, some introductory material is explained, including explanations concerning client-server computing, InterNet addresses, URL's and browsing of the Web.

Client-Server Computing

Figure 1A:
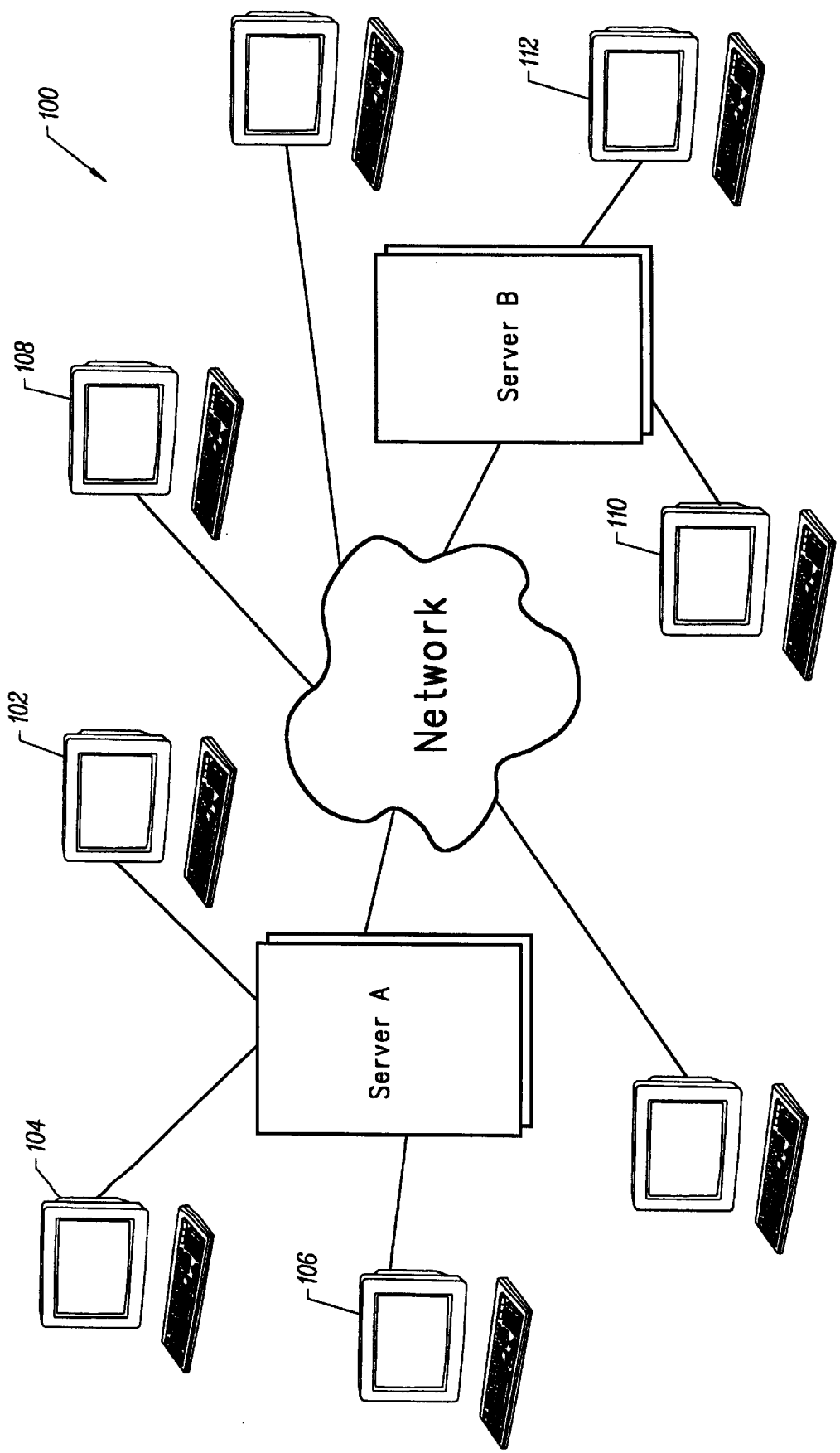
FIG. 1A is a pictorial diagram of a computer network used in the present invention.

FIG. 1A illustrates a conceptual diagram of a computer network 100, such as the InterNet. Computer network 100 comprises small computers (such as computers 102, 104, 106, 108, 110 and 112) and large computers, such as computers A and B, commonly used as servers. In general, small computers are "personal computers" or workstations and are the sites at which a human user operates the computer to make requests for data from other computers or servers on the network. Usually, the requested data resides in large computers. In this scenario, small computers are clients and the large computers are servers. In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 102, may request a file from server A. Since computer 102 is directly connected to server A through a local area network, this request would not normally result in a transfer of data over what is shown as the "network" of FIG. 1. The "network" of FIG. 1 represents the InterNet which is an interconnection of networks. A different request from computer 102 may be for a file that resides in server B. In this case, the data is transferred from server B through the network to server A and, finally, to computer 102. The distance between servers A and B may be very long, e.g. across continents, or very short, e.g., within the same city. Further, in traversing the network the data may be transferred through several intermediate servers and many routing devices, such as bridges and routers.

The World-Wide-Web ("The Web") uses the client-server model to communicate information between clients and servers. Web Servers are coupled to the InterNet and respond to document requests from Web clients. Web clients (also known as Web "browsers") are programs that allow a user to simply access Web documents located on Web Servers.

Figure 1B:
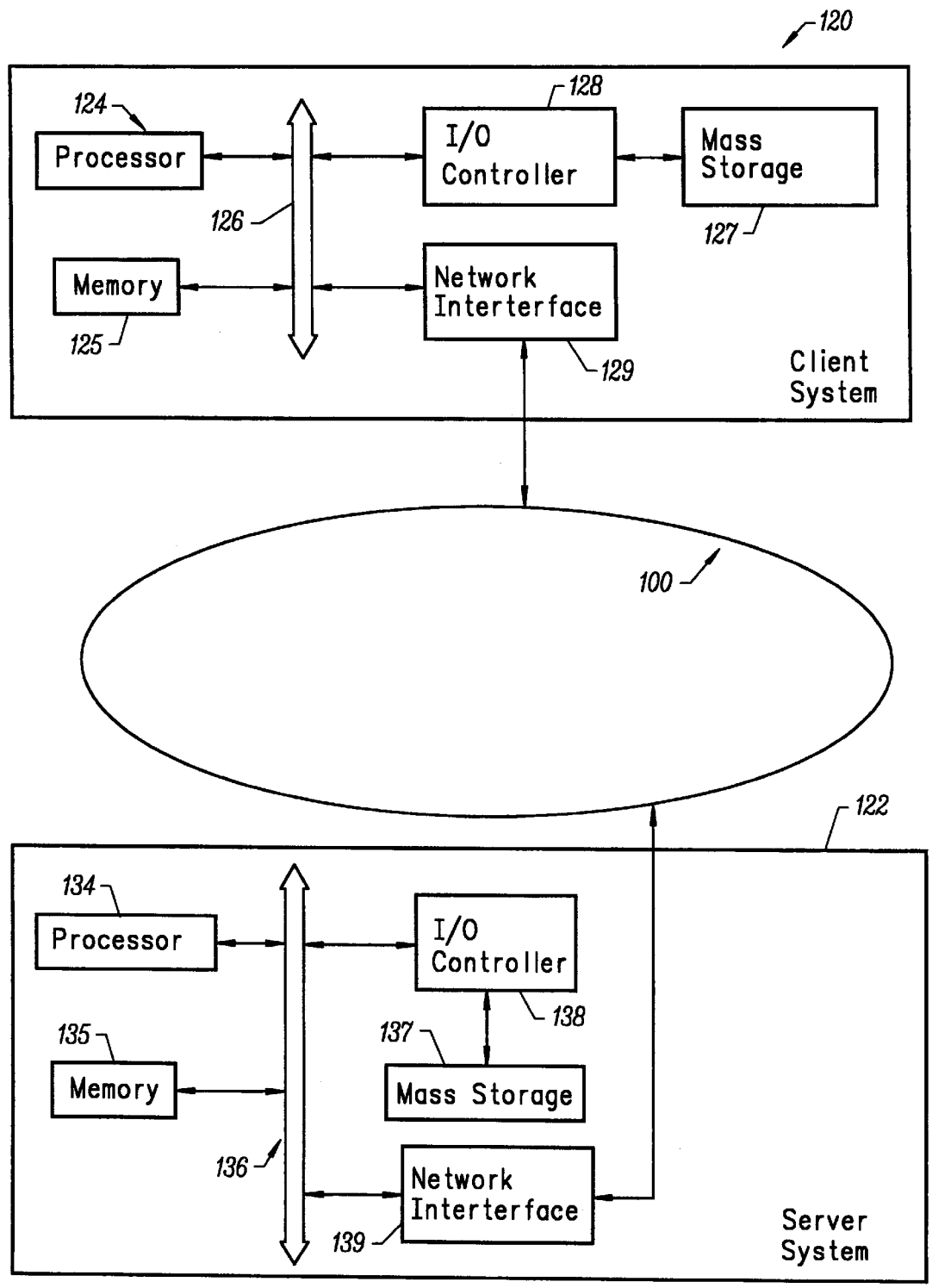
FIG. 1B shows a computer network containing a client system and a server system.

FIG. 1B shows, in more detail, an example of a client-server system interconnected through the InterNet 100. In this example, a remote server system 122 is interconnected through the InterNet to client system 120. The client system 120 includes conventional components such as a processor 124, memory 125 (e.g. RAM), a bus 126 which couples the processor 124 and memory 125, a mass storage device 127 (e.g. a magnetic hard disk or an optical storage disk) coupled to the processor and memory through an I/O controller 128 and a network interface 129, such as a conventional modem.

The server system 122 also includes conventional components such as a processor 134, memory 135 (e.g. RAM), a bus 136 which couples the processor 134 and memory 135, a mass storage device 137 (e.g. a magnetic or optical disk) coupled to the processor 134 and memory 135 through an I/O controller 138 and a network interface 139, such as a conventional modem. It will be appreciated from the description below that the present invention may be implemented in software which is stored as executable instructions on a computer readable medium on the client and server systems, such as mass storage devices 127 and 137 respectively, or in memories 125 and 135 respectively.

InterNet Addresses

As discussed in the background, the InterNet consists of a worldwide computer network that communicates using well defined protocol known as the InterNet Protocol (IP). Computer systems that are directly connected to the InterNet each have an unique InterNet address. An InterNet address consists of four numbers where each number is less than 256. The four numbers of an InterNet address are commonly written out separated by periods such as 192.101.0.3

To simplify InterNet addressing, the "Domain Name System" was created. The domain name system allows users to access InterNet resources with a simpler alphanumeric naming system. An InterNet Domain name consists of a series of alphanumeric names separated by periods. For example, the name "drizzle.stanford.edu" is the name for a computer in the physics department at Stanford University. Read from left to right, each name defines a subset of the name immediately to the right. In this example, "drizzle" is the name of a workstation in the "stanford" domain. Furthermore, "stanford" is a subset of the "edu" domain. When a domain name is used, the computer accesses a "Domain Name Server" to obtain the explicit four number InterNet address.

Uniform Resource Locators

To further define the addresses of resources on the InterNet, the Uniform Resource Locator system was created. A Uniform Resource Locator (URL) is a descriptor that specifically defines a type of InterNet resource and its location. URLs have the following format:

resource_type://domain.address/path_name

Where "resource_type" defines the type of internet resource. Web documents are identified by the resource type "http" which indicates that the hypertext transfer protocol should be used to access the document. Other resource types include "ftp" (file transmission protocol) and "telnet". The "domain.address" defines the domain name address of the computer that the resource is located on. Finally, the "path_name" defines a directory path within the file system of the server that identifies the resource. The right most name on the path name portion is usually the name of an actual file. Web pages are identified by the resource type "http". By convention, most Web pages end with the suffix ".html" that suggests the file is a HyperText Markup Language document.

An example of a URL for a Web document is:

http://info.cern.ch/hypertext/Datasources/WWW/Geographical.html

This URL indicates that by using the HTTP (Web) protocol to reach a server called "info.cern.ch", there is a directory "hypertext/Datasources/WWW" that contains a hypertext document named "Geographical.html." Resources on the Internet are uniquely addressable by their URL.

Browsing the World-Wide-Web

To access an initial Web document, the user enters the URL for a Web document into a Web browser program. The Web browser then sends an http request to the server that has the Web document using the URL. The Web server responds to the http request by sending the requested HTTP object to the client. In most cases, the HTTP object is an plain text (ASCII) document containing text (in ASCII) that is written in HyperText Markup Language (HTML). The HTML document usually contains hyperlinks to other Web documents. The Web browser displays the HTML document on the screen for the user and the hyperlinks to other Web documents are emphasized in some fashion such that the user can selected the hyperlink.

Figure 2:
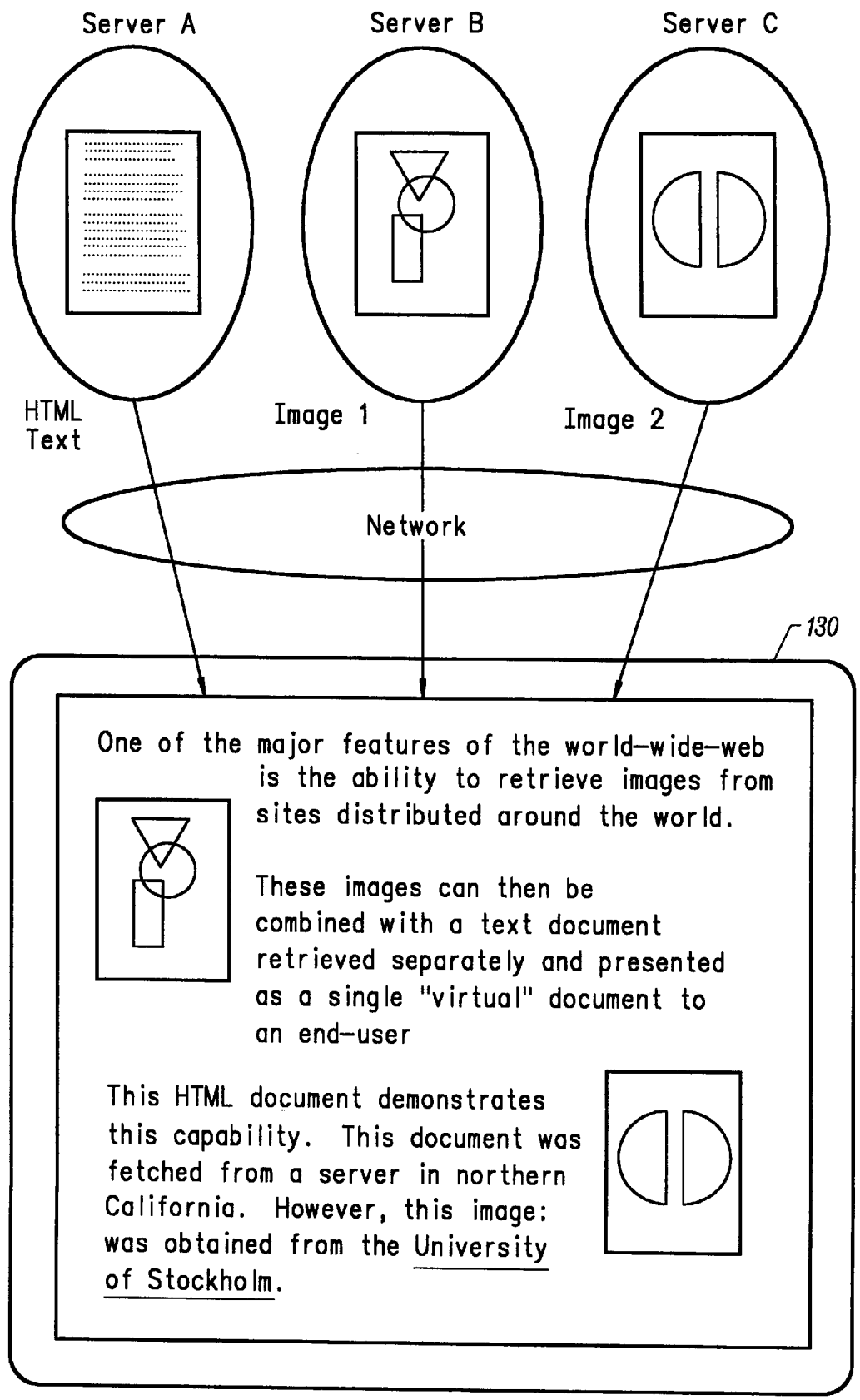
FIG. 2 illustrates the retrieval of remote text and images and their integration in a document.

FIG. 2 illustrates the retrieval of remote text and images and their integration in a Web page by a client computer 130. In FIG. 2, server A contains a text document coded in a standard HTML format. Server B contains an image file called Image 1 and server C contains another image file called Image 2. Each of these servers is remotely located from the other servers and the client 130. The transfer of data is via the Internet. It should be appreciated that the text and image files could be located in the same server which is remote from client 130.

FIG. 3A shows an example of an HTML document. FIG. 3B shows the corresponding integrated document (Web page) as it would appear on a display screen of a client computer. The first line of the document in FIG. 3A reads "<title>Distributed Image Loading Example</title>." In this case, the tags <title> and </title> are HTML delimiters corresponding to the beginning and ending, respectively, of text that is designated as the title of the HTML document. The title could be used for various purposes, such as listing of the document in an automatically generated index.

The second line of the HTML document of FIG. 3A reads "<h1>Distributed Image Loading Example</h1>" The <h1> and </h1> are HTML delimiters for a header that is to be displayed in a largest font. The browser software running on the client computer 130 interprets the header tags and thus displays the text between the header tags in a largest font size on the client's display screen.

After the title and header, the HTML document of FIG. 3A contains the text "One of the major features . . . capability". At the end of the text paragraph is another HTML tag shown as <p>. This is a tag indicating the end of a paragraph.

To continue with the second paragraph of the HTML document, the text reads "This document . . . this image: <IMG align=middle src="http://www.su.se/SUlogo.gif"> was obtained . . . ". The text in angle brackets defines an image to be placed in the text. Specifically, the "IMG" tag indicates that an image is being defined. The "align=middle" tag indicates that the image should be aligned in the middle of the current line of text. Finally, "src=" tag indicates that the source image file can be located using the URL "http://www.su.se/SUlogo.gif".

The line continues with the phrase "from the <A href="http://www.su.se/index.html"> University of Stockholm</A> This phrase defines "University of Stockholm" as a link to another Web document. Specifically, the "A" tag defines the beginning of a link. The "href=" tag defines that the link is to a Web page that can be located using the URL "http://www.su.se/index.html" Next, the text "University of Stockholm" is the text that will be the link. Finally, the "/A" tag defines the end of the link definition. As illustrated in FIG. 3B, the text "University of Stockholm" is displayed with underlining that indicates it is a link to another document. If the user selects the underlined text "University of Stockholm", then the browser will send out a http request for the Web page at the URL address "http://www.su.se/index.html".

It can be seen from the above example that the HTML document contains all information a browser needs for displaying a Web page. Thus, the only responsibility of a Web server is to provide the requested document, and there is no need for the server to request a client to do anything else. However, this role of a server also limits the utility of the Web environment.

Adding State Information To The HyperText Transfer Protocol

The present invention provides an extension to the prior art HTTP protocol. Using the teachings of the present invention, when a server responds to an http request by returning an HTTP object to a client, the server may also send a piece of state information that the client system will store. In an embodiment of the present invention, the state information is referred to as a "cookie". Included in the state information (the cookie) is a description of a range of URLs for which that state information should be repeated back to. Thus, when the client system sends future HTTP requests to servers that fall within the range of defined URLs, the requests will include a transmittal of the current value of the state object. By adding the ability to transfer state information back and forth, Web servers can then play an active role in transactions between clients and servers. The term state object is also used herein to refer to the state information.

Figure 4:
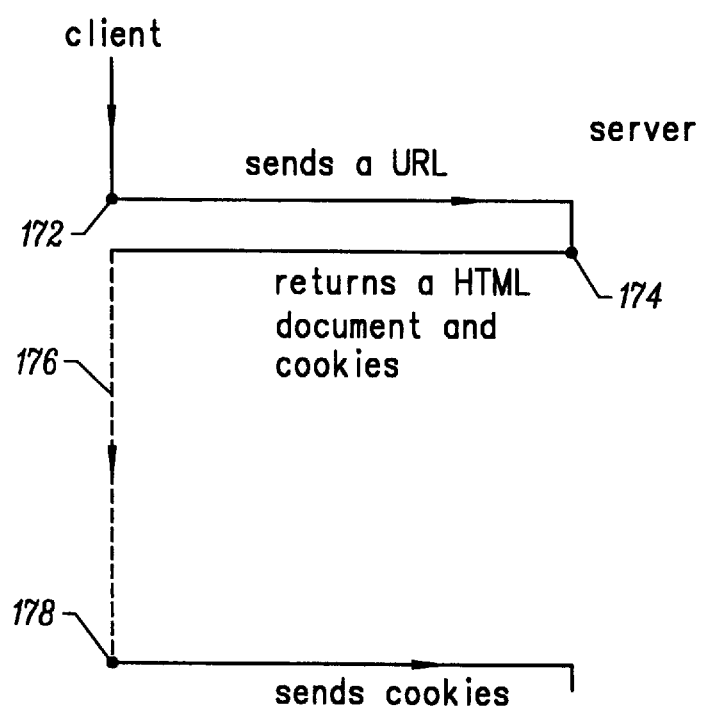
FIG. 4 shows schematically the flow of information between a client and a server in accordance with the present invention.

FIG. 4 is a drawing showing schematically the flow of information between a client system and a server system. At a time indicated by numeral 172, the client system sends an http request to the Web server. In response to the http request, the server returns an HTML document together with a header, which is typically separate from the HTML documents, at a time indicated by numeral 174. The header may contain one or more cookies. Upon receiving the HTML document and the header, the client system displays an HTML document on the screen and stores the cookies in a memory such as a storage medium. The client may switch and work on other tasks, or may be shut down completely. This is indicated by a dash line 176. At a time indicated by numeral 178, the client system may access a Web server that is specified in the received cookie such that the client system transmits the cookies to the server, thus providing state information about the client system to the server system.

This extension to the http protocol provides a powerful new tool which enables a large number of new types of applications to be written for a Web-based environment. Examples of new applications include on-line shopping that stores information about items currently selected by consumers, for-fee on-line services that can send back registration information and thus free users from retyping a user-id on next connection, and Web sites that can store per-user preferences on the client system and have the client supply those preferences every time the site is later accessed.

Server Behavior

A particular embodiment of the state information is described below in order to provide an example according to the present invention. It will be appreciated that alternative formats may be used in accordance with the principles of the present invention. As stated above, the extension to the HTTP protocol adds a new piece of state information to the HTTP header as part of an HTTP response from a Web server. Typically, the state information is generated by a common gateway interface ("CGI") script. The state information is stored by the receiving client system in the form of a "cookie list" for later use. The syntax of the new data, in one embodiment, is:

Set-Cookie: NAME=VALUE; expires=DATE; path=PATH;
domain=DOMAIN_NAME; secure

The capitalized terms can be set by the server system. The first attribute is "NAME=VALUE". This attribute serves to identify a cookie. The "NAME" attribute is a name for the cookie. The "NAME" attribute is the only required attribute on the "Set-Cookie" header in one embodiment. The "VALUE" is a value assigned to the previously defined name. The "VALUE" is a string of characters excluding, in one embodiment, semicolon, comma, and white spaces. If there is a need to place these characters in the VALUE, standard encoding methods, such as URL's type % XX encoding, can be used.

The "expires" attribute specifies a data string that defines the valid life time of the corresponding cookie. Once the expiration date has been reached, the cookie will no longer be stored in the client system. Thus, the client system will no longer respond to Web servers with the cookie. Many coding schemes for designating time can be used. In a preferred embodiment, the "expires" attribute is formatted as: Wdy, DD-Mon-YY HH:MM:SS GMT In the this format, "Wdy" designates the day of a week, "DD-Mon-YY" designates the day, month and year, and "HH:MM:SS GMT" designates the hour, minute and second, in GMT time zone. Note that the "expires" attribute lets a client know when it is safe to purge a cookie, however, the client is not required to delete the cookie. If an expires attribute is not provided by the server, then the cookies expires when the user's session ends. This can be implemented by storing the cookie only in volatile memory.

The "domain=DOMAIN_NAME" attribute defines a domain for which the cookie is valid. The domain attribute is usually set using the domain name of the sending Web server. Client systems examine the domain attribute when making later http requests. If the server that the client system is accessing falls within the defined DOMAIN_NAME, then the cookie may be sent to the server when making the http request. (The "path" must also be examined as will be explained later.) When a server system falls within the defined DOMAIN_NAME, this is referred to as a "tail match." Note that a domain name that defines a subset of a domain is deemed to match a larger enclosing domain. For example, the host names "anvil.acme.com" and "shipping.crate.acme.com" fall within the "acme.com" domain.

Only hosts within the specified domain can set a cookie for a domain. The value of the "domain" attribute must have at least two periods in them to prevent accepting values of the form ".com" and ".edu". If no domain name is specified, then the default value of the "domain" attribute is the domain name of the server that generated the cookie header.

The "path" attribute is used to specify a subset of file system directories in a domain for which the cookie is valid. If a cookie has already passed "domain" matching, then the path name of the URL for a requested document is compared with the "path" attribute. If there is a match, the cookie is considered valid and is sent along with the http request. All the characters of the defined path must match, however there may be additional characters on the path name. Thus, further defined subdirectories will match a path to the parent director. For example, the path "/foo" would match "/foo/bar", "/foo/bar.html", and even "/foobar", but "/foo" will not match the path "/". Note that the path "/" is the most general path since it will match any path. If no path is specified when a cookie is created, then the default path will be the same path as the document that was sent with the header which contains the cookie.

The last element of the cookie definition is the optional label of "secure." If a cookie is marked "secure," then the cookie will only be retransmitted if there is a secure communication channel to the server system. In a preferred embodiment of the present invention, this means that the cookie will only be sent to HTTPS servers. (HTTP over SSL) If the "secure" attribute is not specified, a cookie is considered safe to be sent over unsecured channels.

The defined extension to the HTTP protocol allows multiple set-cookie headers to be issued in a single HTTP response. Each set-cookie header should follow the conventions of the above described format.

Client Behavior

As previously described, when a client receives a set-cookie command in a header, the client system stores the cookie in some type of storage. In order not to place too much burden on client systems, each client system is expected to be able to store only a limited number of cookies. In one embodiment, the storage requirements for the client systems are:

(1) 300 total cookies;
(2) 4 kilobytes per cookie; and
(2) 20 cookies per server or domain (note that this rule treats completely specified hosts and domains which are different as separate entities, and each entity has a 20 cookies limitation).

Servers should not expect clients to be able to exceed these limits. When the 300 total cookies or the 20 cookie per server limit is exceeded, clients may delete the least recently used cookie even if the cookie's "expires" time has not passed.

If a cookie is received that matches the "NAME", "domain" and "path" attributes of a previously received cookie, then the previously received cookie will be overwritten. Using this technique, it is possible for a server to delete a cookie previously sent to a client. Specifically, a server that wishes to delete a previous cookie sends a cookie having "expires" time which is in the past that matches the "NAME", "domain" and "path" attributes of cookie to be deleted. Since the new overwritten cookie contains a expires time that has passed, the cookie will be deleted by the client system. Note "NAME", "domain" and "path" attributes of the expired cookie must match exactly those of the valid cookie. Since a system must be within the domain that is specified in the domain attribute, it is difficult for any server other than the originator of a cookie to delete or change a cookie.

When a client system that implements the present invention wishes to send an http request to a particular Web server, the client system first examines its cookie list to see if the cookie list contains any matching cookies that need to be sent to the particular Web server. Specifically, before the client sends an http request to a Web server, the client compares the URL of the requested Web document against all of the stored cookies. If any of the cookies in the cookie list matches the requested URL then information containing the name/value pairs of the matching cookies will be sent along with the HTTP request. The format of the line is:

Cookie: NAME1=value1; NAME2=value2; . . .

When a client sends cookies to a server, all cookies with a more specific path mapping should be sent before cookies with less specific path mappings. For example, a cookie "name1=foo" with a path mapping of "/bar" should be sent before a cookie "name2=foo2" with a path mapping of "/" if they are both to be sent since the path "/bar" is more specific than the global matching path "/".

Paths having a higher-level value do not override more specific path mappings. If there are multiple matches for a given cookie name, but with separate paths, all the matching cookies will be sent. Thus, both the cookie "name=foo" with a path mapping of "/bar" and the cookie "name=foo" with a path mapping of "/" should be sent since they have different path names.

Some clients access Web servers on the Internet through firewall systems that are designed to prevent unwanted Internet traffic from affecting a local area network coupled to the Internet. Firewall systems often implement "proxy servers" that filter traffic to and from the Internet. It is important that proxy servers not cache Set-cookie commands when caching HTTP information. Thus, if a proxy server receives a response that contains a Set-cookie header, the proxy server should immediately propagate the Set-cookie header to the client. Similarly, if a client system request contains a "Cookie: " header, the cookie header should be forwarded through a proxy even if a conditional "If-modified-since" request is being made.

To further describe the present invention, the following examples describe a set of Web transactions operating in accordance with the present invention:

EXAMPLE 1

A client system requests a Web document from the Web server "telemarking.acme.com" and receives in response:

Set-Cookie: CUSTOMER=WILE_E_COYOTE; path=/;
expires=Wednesday, 09 Nov. 1999 23:12:40

The client system stores this cookie in a local (client-side) storage unit (e.g. mass storage 127 or memory 125). Since no domain name was specifically identified, the domain will be set to "telemarking.acme.com" since that is the domain name of the server that generated the cookie. When the client later makes an http request for a document in any path (since the path is "/") of a server system in the telemarking.acme-.com domain, the client sends:

Cookie: CUSTOMER=WILE_E_COYOTE

Assuming the client system makes another request to the telemarking.acme.com domain, the client might receive another cookie from the server such as:

Set-Cookie: PART_NUMBER=ROCKET_LAUNCHER;
path=/

The client will locally store this additional cookie. Again, no domain name was identified, such that the default domain, "telemarking.acme.com" will be stored. Now, if the client makes yet another request to the "telemarking.acme-.com" domain, the client will send all the cookies it has for that domain. Specifically, the client sends:

Cookie: CUSTOMER=WILE_E_COYOTE;
PART_NUMBER=ROCKET_LAUNCHER

Assuming, the client continues transactions with the "telemarking.acme.com" server, it may receive the following cookie from the server:

Set-Cookie: SHIPPING=FEDEX; path=/foo

Then, if the client requests a document in path "/" on the "telemarking.acme.com" server, the client will send two cookies as state information:

Cookie: CUSTOMER=WILE_E_COYOTE;
PART_NUMBER=ROCKET_LAUNCHER

Note that the cookie SHIPPING=FEDEX was not sent because the path "/" does not match the path "/foo". On the other hand, when the client requests a document on the "telemarking.acme.com" server in path "/foo" on this server, then the client will send three cookies as state information:

Cookie: CUSTOMER=WILE_E_COYOTE;
PART_NUMBER=ROCKET_LAUNCHER;
SHIPPING=FEDEX

EXAMPLE 2

Assume that all of the transactions of Example 1 have been cleared. A client system then requests a Web document from the Web server "telemarking.acme.com" and receives in response:

Set Cookie: PART_NUMBER=ROCKET_LAUNCHER_1;
path=/

The client stores this cookie in a local (client-side) storage unit. Since no domain name was specifically identified, the domain will be set to "telemarking.acme.com". When the client later makes a request to a document in any path of a system in the telemarking.acme.com domain, the client sends back the following data as information:

Cookie: PART_NUMBER=ROCKET_LAUNCHER_1

Assuming the client continues to access the "telemarking.acme.com" server, the client may later receive from the server:

Set-Cookie: PART_NUMBER=RIDING_ROCKET_23;
path=/ammo

The new cookie has the same name (PART_NUMBER) as an old cookie stored on the client system. Note that the old cookie is not overwritten since the new cookie has a different path attribute. Now, if the client makes a request for a document in the path "/ammo" on the "telemarking.acme.com" server, the client should send the following two cookies as state information:

Cookie: PART_NUMBER=RIDING_ROCKET_23;
PART_NUMBER=ROCKET_LAUNCHER_1

Both cookies are sent since the path of the requested document ("/ammo") matches both the "/" path of the first cookie and the "/ammo" path of the second cookie. Note that the cookie PART_NUMBER=RIDING_ROCKET_23 is sent first since it has a more specific path ("/ammo") than the global path ("/") associated with the cookie PART_NUMBER=ROCKET_LAUNCHER_1.

An On-line Shopping System Application

To illustrate one possible use of the state information system of the present invention, an implementation of an on-line shopping system will be described. The on-line shopping system allows customers to shop in one or more stores that are implemented as Web servers on the Internet. A customer can browse information on the Web servers that describe products available from the stores. When a desired product is found, the user can place the product into a "virtual shopping basket." The virtual shopping basket is implemented as a set of cookies that are sent to the client computer system and stored on the client computer system. At check-out time, the customer pays for the selected products using some type of payment system such as a credit card. After payment is received, the on-line shopping system notifies the stores to ship the selected products to the customer.

Figure 5:
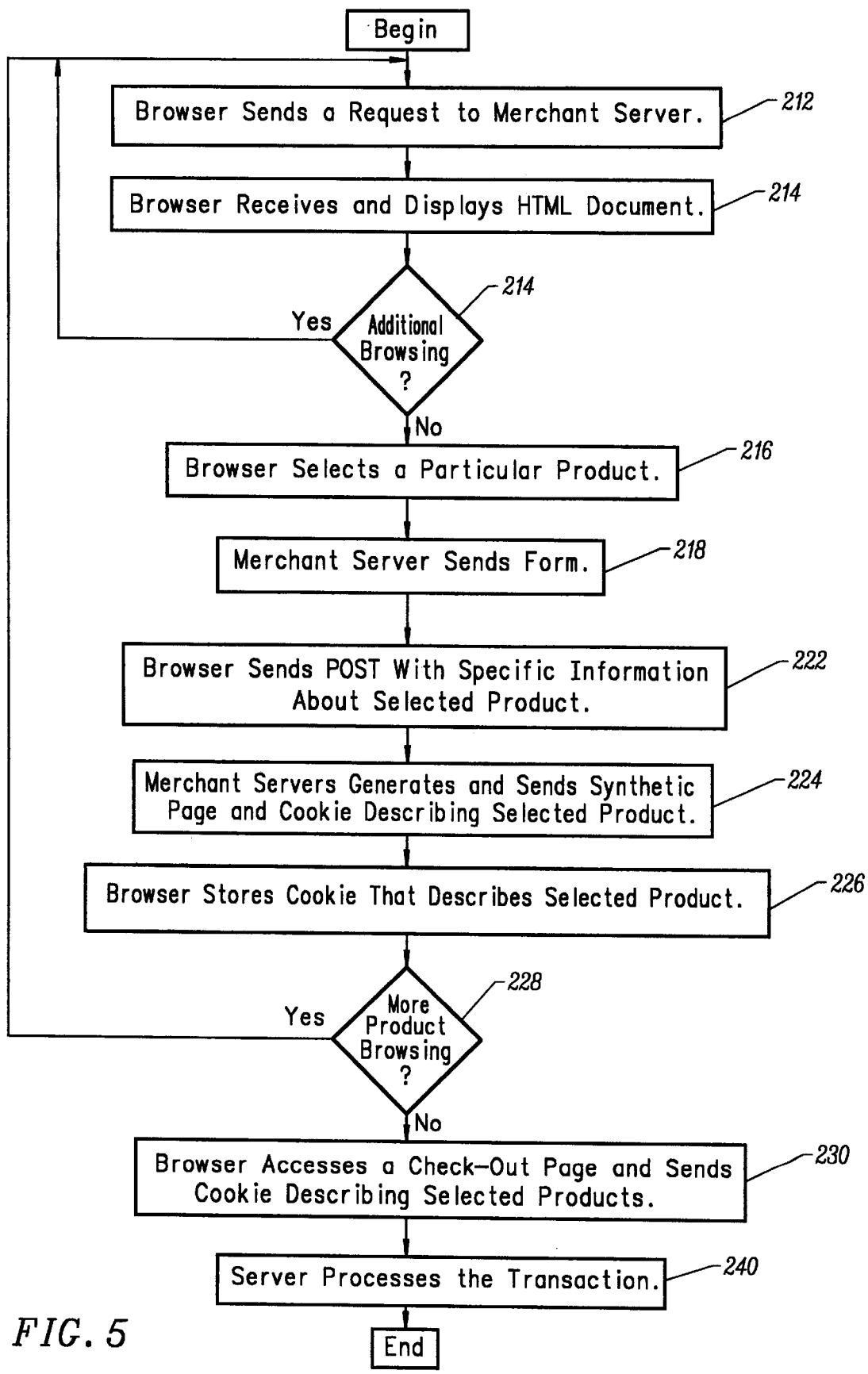
FIG. 5 is a flow chart showing the operation of a merchant system of the present invention.
Figure 6:
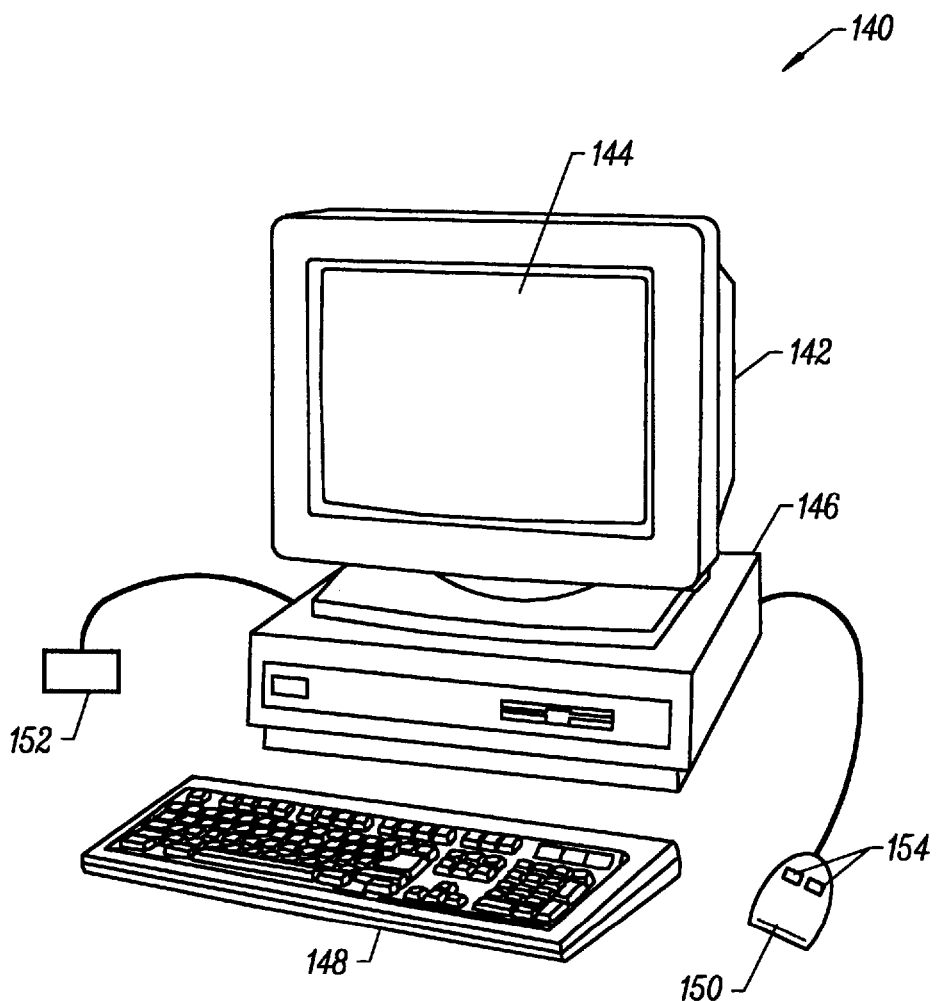
FIG. 6 shows a computer system that could be used to run the browser of the present invention.

FIG. 5 is a flow chart showing the operation of the merchant system during an on-line shopping "trip" by a customer. The customer can run a browser on a client computer system, such as computer system 140 shown in FIG. 6 or client system 120 shown in FIG. 1B. The computer system 140 of FIG. 6 includes a display device 142 (such as a monitor), a display screen 144, a cabinet 146 (which encloses components typically found in a computer, such as CPU, RAM, ROM, video card, hard drive, sound card, serial ports, etc.), a keyboard 148, a mouse 150, and a modem 152. Mouse 150 have one or more buttons, such as buttons 154. The computer needs to have some type of communication device such as that Modem 152 allows computer system 140 to be connected to the Internet. Other possible communication devices include ethernet network cards.

The customer uses Web browser software to access an on-line "merchant" server that is operated by a merchant having products to sell. This merchant server is a server computer system such as server system 122 shown in FIG. 1B. Specifically, the browser software sends an http request for the home Web page of a merchant Web server (step 212). The merchant Web server responds to the request with an HTML document that is displayed by the browser (step 214). The home Web page contains information about the merchant and its products (e.g., shoes, hats, shirts, etc.). The home Web page can implement a set of linked Web pages that describe the products that are available from the merchant. Each product may be associated with its own HTML document that fully describes the product. Products can be described using text, images, sounds, video clips, and any other communication form supported by Web browsers. The user can continue browsing through Web pages of the merchant server by repeating steps 212, 214, and 215.

After browsing through the Web pages provided by the server, the customer may select a product (step 216) by, for example, "clicking" (in the conventional manner) on an image of a product that causes the browser to request a Web page that fully describes the product. If the customer wishes to buy shoes from the merchant, the customer could click on a "buy it" button. The merchant server then sends an HTML form document that requests the customer to send necessary details for the purchase (step 218). For example, the customer may select a quantity, a desired style, and size of the product as requested by the form document. The browser then sends a POST command under HTTP, which transmits the data entered into the form to the merchant server (step 222). The data on the submitted form (e.g., quantity, size, style, etc.) is analyzed by the server and the transaction is processed. The server then generates a synthetic page and sends it to the browser running on the client system. This synthetic page preferably contains a thank you note along with confirmation information. Cookies containing information describing the selected product are also sent at this time (step 224).

The browser software running on the client system stores the cookies describing the selected products within the client computer system (step 226). The stored cookies include an identification of the contents of a virtual shopping basket that contains the products selected by the consumer. In an embodiment of the present invention, the cookies are stored in a file located in a storage medium (such as a hard disk) of client computer system 140.

The time interval for storing the cookies that describe the selected products can be set to any desired length. In one embodiment of the present invention, the cookies are deleted when the customer exits from the browser. This can be accomplished by not setting the "expires" attribute of the product description cookies. In another embodiment of the present invention, the cookies are kept valid (prior to their expiration) even after the customer exits from the browser and turns off computer 140. This can be accomplished by setting the "expires" attribute of the product description cookies to a later date.

After selecting a product, the customer may do additional shopping (e.g., buy a hat) from the same store or other stores (step 228). In this case, steps 212, 214, 215, 216, 218, 222, 224 and 226 need to be performed for the additional products. Each selection of a product in step 222 will result in the transmission of a cookie from the server to the client, which cookie identifies the selected product. The customer may also exit from the merchant system at any time.

When the customer desires to buy the products, the customer accesses a link that identifies a "check-out" Web page. The check-out Web page causes the browser to send all the product description cookies (230). Thus, the check-out Web page empties out the virtual shopping basket. The merchant server generates a total bill for all the products in the virtual shopping basket. The server may then request billing information (e.g., credit card number) and shipping (e.g., address) information from the customer using a form. In a preferred embodiment the transaction of credit card information is transmitted using a secure medium. The transaction server then performs a real-time credit card authorization. Once the transaction is authorized, transaction server sends messages to individual merchants to fulfill the order (step 240).

Other functions could be added to the above described merchant system. For example, several persons could use the same browser for shopping. In this case, the browser identifies the person doing the shopping, and assigns product description cookies to the appropriate person. Thus, each person would have their own virtual shopping basket.

The invention has been described with reference to specific exemplary embodiments thereof and various modifications and changes may be made thereto without departing from the broad spirit and scope of the invention. The specification and drawings are, accordingly, to be regarded in an illustrative rather than a restrictive sense; the invention is limited only by the following claims.

What is claimed is:

1. A method of on-line shopping by a customer using a browser running on a client computer, said method comprising the steps of:

sending a first request by said browser to a merchant server for a first HTML document describing a product;

displaying said HTML document on said client computer, said displayed HTML document describing said product;

selecting, by said customer, said product;

sending a second request by said browser to said merchant server in response to said selection made by said customer;

sending a state object from said merchant server to said browser, said state object identifying said product; and storing said state object on said client computer by said browser.

2. The method of claim 1 wherein state object remains valid for a predetermined time.

3. The method as claimed in claim 1 further comprising the steps of:

requesting a check-out page by said customer;

sending a third request to said check-out page on a server; and sending said state object along with said third request to said server.

4. A computer system comprising:

a display;

a processor coupled to said display;

a memory coupled to said processor;

a computer readable medium coupled to said processor, said computer readable medium containing executable program instructions for:
sending a first request to a merchant server for a first HTML document describing a product;
displaying said HTML document on said display, said displayed HTML document describing said product;
allowing a customer to select said product;
sending a second request to said merchant server in response to said selection made by said customer;
sending a state object from said merchant server to said computer system, said state object identifying said product; and
storing said state object on said computer system.

* * * * *